(12) United States Patent
Warner, Jr. et al.

(10) Patent No.: US 7,525,707 B2
(45) Date of Patent: Apr. 28, 2009

(54) PARALLEL-BEAM SCANNING FOR SURFACE PATTERNING OF MATERIALS

(75) Inventors: Raymond M. Warner, Jr., Edina, MN (US); Earl E. Masterson, Guerneville, CA (US); Lynn Millar, legal representative, Guerneville, CA (US); John E. MacCrisken, Palo Alto, CA (US)

(73) Assignee: Semicube, Inc., Eden Prairie, MN (US)

( * ) Notice: Subject to any disclaimer, the term of this patent is extended or adjusted under 35 U.S.C. 154(b) by 0 days.

(21) Appl. No.: 12/099,642

(22) Filed: Apr. 8, 2008

(65) Prior Publication Data

US 2008/0192316 A1 Aug. 14, 2008

Related U.S. Application Data

(62) Division of application No. 11/027,579, filed on Dec. 30, 2004, now Pat. No. 7,371,596.

(51) Int. Cl.
*G02B 26/08* (2006.01)
*B23K 26/06* (2006.01)
(52) U.S. Cl. .................. 359/202; 359/201; 219/121.74; 219/121.8
(58) Field of Classification Search .......... 359/201–202
See application file for complete search history.

(56) References Cited

U.S. PATENT DOCUMENTS 4,214,918 A 7/1980 Gat et al.

(Continued)

OTHER PUBLICATIONS

"LaserMagic Productions Projection Systems", Laser Magic Productions web page, 1998, 5 pages.

(Continued)

*Primary Examiner*—James Phan
(74) *Attorney, Agent, or Firm*—Meyertons Hood Kivlin Kowert & Goetzel, P.C.; Jeffrey C. Hood; Mark S. Williams

(57) ABSTRACT

A system and method for parallel-beam scanning a surface. An energetic beam source emits an energetic collimated beam which is received by an optical device, comprising: one or more optical media, operable to receive the emitted beam, such as two pairs of coordinated mirrors or a right prism, and at least one actuator coupled to the one or more optical media, and operable to rotate each of the one or more optical media around a respective axis to perform a parallel displacement of the beam in a respective direction, wherein the respective direction, the beam, and the respective axis are mutually orthogonal. The optical device is operable to direct the beam to illuminate a sequence of specified regions of a surface.

15 Claims, 9 Drawing Sheets

U.S. PATENT DOCUMENTS

| | | | |
|---|---|---|---|
| 4,655,850 A | | 4/1987 | Kakimoto et al. |
| 4,727,381 A | | 2/1988 | Bille et al. |
| 5,029,955 A | * | 7/1991 | Chu .......................... 359/17 |
| 5,436,192 A | | 7/1995 | Epler et al. |
| 6,033,741 A | | 3/2000 | Haruta et al. |
| 6,344,116 B2 | | 2/2002 | Warner et al. |
| 6,548,796 B1 | | 4/2003 | Silvermintz et al. |
| 6,657,765 B2 | | 12/2003 | Hayashi et al. |
| 6,747,245 B2 | | 6/2004 | Talwar et al. |
| 6,832,724 B2 | | 12/2004 | Yavid et al. |
| 7,188,769 B2 | | 3/2007 | Silverbrook et al. |
| 2002/0086502 A1 | | 7/2002 | Liu et al. |
| 2002/0122219 A1 | | 9/2002 | Funk |

OTHER PUBLICATIONS

Weiner et al., "Low Temperature Fabrication of p+-n Diodes with 300-Å Junction Depth", IEEE Electron Device Letters, vol. 13, No. 7, Jul. 1992.

Carey et al., "Fabrication of Submicrometer MOSFET's Using Gas Immersion Laser Doping (GILD)" IEEE Electron Device Letters, vol. EDL-7, No. 7, Jul. 1986.

* cited by examiner

PARALLEL-BEAM SCANNING FOR SURFACE PATTERNING OF MATERIALS

PRIORITY DATA

This application is a Divisional of U.S. application Ser. No. 11/027,579, titled "Parallel-Beam Scanning for Surface Patterning of Materials", filed Dec. 30, 2004, U.S. Pat. No. 7,371,596, whose inventors are Raymond M. Warner, Jr., Earl E. Masterson, John E. MacCrisken, and Mark S. Williams, which is hereby incorporated by reference in its entirety as though fully and completely set forth herein.

FIELD OF THE INVENTION

The present invention relates to the field of manufacture, and more particularly to a system and method for patterning of a surface via an energy beam, such as a semiconductor surface, where the beam causes local heating and may be used to effect local melting of the surface of the material to cause thermally based effects such as dopant diffusion, oxidation, crystallization, and so forth.

DESCRIPTION OF THE RELATED ART

Surface patterning refers to the creation or generation of patterns on material surfaces. Many methods have been in use for some time, particularly for surface treatment and patterning of semiconductor wafers. For example, diffusion and ion implantation, rapid thermal processing (RTP), laser etching, reactive ion etching, epitaxial growth, physical and chemical deposition methods based on sputtering, Chemical Vapor Deposition (CVD), and other techniques have been used in conjunction with masks to select the portions of the surface to be treated. However, these approaches have various problems relating to precise and controllable patterning when divergent beams are employed, specifically as regards scanning a plane surface.

For example, galvanometer laser beam scanners, e.g., such as those provided by Cambridge Technology Inc., are well known but do not address these problems (sufficiently precise control of divergent beams so as to scan a plane surface effectively).

In some prior art approaches, mirrors are used to control the beam. For example, in one approach to a mirror-scanning mechanism, two galvanometer mirrors may be arranged in series with mutually orthogonal rotational axes. The laser beam strikes the first mirror, which reflects it to the second, which in turn reflects it to the target surface. If one assumes that the apparent source of the beam is a fixed point located at the center of a spherical surface, then such a system may scan uniformly a "spherical rectangle" on the inner surface of the sphere, e.g., a region bounded by two pairs of mutually orthogonal great-circle segments. However, this "spherical" scan technique is not adequate for scanning a plane surface; the resulting geometrical distortion is a serious shortcoming of such an arrangement.

Another problem is that in prior dual mirror systems the apparent source position is not fixed. In other words, as the mirrors rotate on their respective axes, the apparent source of the laser beam changes. Said another way, in such prior art approaches, the laser beam strikes the first mirror at a point on its axis, and then necessarily strikes a point that moves from side to side across the axis of the second mirror, and so, even in the best case there is still a linear translation of the apparent source. In other words, the apparent source moves along a straight-line segment. This defect has been termed "positional jitter" or "displacement jitter." (See FIG. 1, described below).

FIG. 1 illustrates a prior art dual mirror arrangement demonstrating some of the above issues, including positional jitter. As FIG. 1 shows, a beam source, e.g., laser 100, emits a beam 101 which impinges a first mirror 102 that is rotatable (e.g., via an actuator, such as a galvanometer, etc.) about a vertical axis 103. The first mirror 102 reflects the beam 101 to a second mirror 104 that is rotatable about a horizontal axis 105, which in turn reflects the beam to a target 108. Thus, the first mirror 102 may be used to angularly deflect the beam horizontally, as indicated by the dashed secondary path of the beam in FIG. 1. Similarly, the second mirror 104 may be used to angularly deflect the beam vertically, although in FIG. 1, the second mirror is shown in a neutral position, i.e., with no rotation about the horizontal axis 105. Note that the mirrors could also be swapped, such that the first mirror has a horizontal axis of rotation, and the second mirror has a vertical axis of rotation.

As FIG. 1 shows, the horizontal deflection of the beam results in a change in apparent beam source position from the target's perspective, denoted as "displacement jitter" in the Figure. In prior art systems, this effect is generally detrimental to accurate beam positioning on the target. To stabilize the apparent beam source, it would be necessary to have the laser beam strike a mirror that is capable of rotation about two orthogonal axes, where the laser strikes the mirror at the intersection of the axes. Such a product exists, being available from Newport Corporation, Irvine, Calif., as a Fast Steering Mirror (FSM) with two-axis high-bandwidth motion. In this approach, a single mirror driven by a "voice coil" is capable of both X and Y deflection, employing magnetic forces produced by a solenoid to create the desired motion. These mirrors are sometimes used in pairs, where one mirror is used to fine tune beam position (e.g. the Newport BSD-2A Beam Steerer), and a second mirror is used for "beam stabilization" via a feedback system, (both of which suggest a lack of precision in mirror-position control). This configuration attempts to solve the apparent-source-motion problem but still uses diverging beams and thus does not solve the problem of geometrical distortion on a plane surface, e.g., due to non-normal incidence of the beam on the target. In other words, this approach also suffers from the "spherical" scanning issue described above.

Another prior art approach called Gas-Immersion Laser Doping (GILD) has been demonstrated at Lawrence Livermore National Laboratories. In this approach, a silicon sample is placed in a gas of dopant atoms or of decomposable molecules containing dopant atoms. A pattern mask is interposed between the target surface and a beam source. An energetic laser, e.g., in the ultraviolet spectrum where surface absorption for silicon is high, then illuminates the masked surface, melting a thin layer of surface silicon (where not masked), whereupon liquid-phase diffusion, orders of magnitude more rapid than solid-phase diffusion, leads to a near-uniform density of dopant in the melt, even in the brief time before refreezing of the silicon surface occurs.

This technique may be used for surface patterning of a semiconductor substrate such as monocrystalline Silicon or Germanium or Gallium Arsenide or other Periodic Table Group IV elements or Group III-V compounds or Group II-VI compounds, or other combinations, as is known in the art of manufacture of crystalline semiconductor substrates. However, such broad illumination of the masked surface requires very powerful beam sources, which are substantially expensive and dangerous.

GILD and other alternative methods and systems (with relevant applications) are more fully described in U.S. Pat. No. 5,346,850, which is hereby incorporated by reference. Also see K. H. Weiner et al., "Low-Temperature Fabrication of P+–n Diodes with 300-A Junction Depth," IEEE Electron Device Lett. vol. 13, no. 7, pp. 369-371 (July, 1992), as well as P. G. Carey et al., "Fabrication of Submicrometer MOSFET's Using Gass Immersion Laser Doping (GILD)", IEEE Electron Device Letters, Vol. EDL-7, No. 7, July 1986, U.S. Pat. No. 6,680,485; U.S. Pat. No. 6,509,217; U.S. Pat. No. 6,372,592; U.S. Pat. No. 5,885,904; each of which is hereby incorporated by reference.

SUMMARY OF THE INVENTION

Various embodiments of a system and method for patterning a surface are presented. One embodiment of the present invention comprises a scanning UV-laser-beam system for the patterned heat-treating of a surface. It is characterized by the following possible benefits:

1. The system may treat an area measuring a fraction of a cm2 to a few cm2;
2. The system may have a megapixel to gigapixel or greater resolution (i.e. capable of being used to sub-micron effective scanning spot size);
3. The beam may be of high intensity or fluence (sufficient to melt silicon);
4. The process may be driven by a low-power to medium-power laser, e.g., a milliwatt laser;
5. The system may use optics that:
   a. may be lens-free, i.e., using reflective media (e.g., mirrors) only;
   b. may be mirror-free, i.e., using transmissive media only;
   c. have a wide working-distance range from optics to target, e.g. from approximately one centimeter to one or more meters; and
   d. are "straight ahead" in the sense that beam direction is essentially unidirectional.

First, a beam may be received from an energetic beam source, e.g., by an optical device, where the beam has an initial direction. The beam source may be any of various types of beam source, such as, for example, a UV laser or other beam source, one or more UV lamps with a collimator, etc. The beam is preferably a collimated radiation beam. In some preferred embodiments, a laser beam with a wavelength of approximately 193 nanometers or 308 nanometers may be used. The beam is preferably operable to locally energize an illuminated region of a surface, referred to as a "pixel", whose size is determined by the beam spot size, i.e., the beam's cross-sectional area.

The optical device preferably includes one or more elements that are rotatable about one or more respective axes, and which may operate to displace the beam in a direction orthogonal to the beam, where the beam displacement direction and magnitude correspond to the rotation (direction and magnitude). In preferred embodiments, the optical device comprises a parallel-beam scanner, various embodiments of which are described below.

One or more optical elements may be rotated about respective axes to displace the beam in a specified direction orthogonal or normal to the beam, where the displaced beam is parallel to the received beam.

A respective region of the surface may be illuminated with the displaced beam, where the respective region corresponds to positions of the rotated one or more optical elements. For example, the surface may comprise a silicon wafer, where the illuminated region may be heated and possibly melted to effect efficient dopant diffusion into the illuminated region. The dopant may be sourced from the enclosing gas (as in GILD) or from a layer of dopant-containing material, such as heavily doped silicon (e.g. with Boron or other P-type dopant, or Phorphorous or Arsenic or other N-type dopant) deposited using sputter-epitaxy, or a spin-on dopant such as boron or arsenic.

The method elements described above may be repeated to energize a specified sequence of respective regions of the surface, thereby patterning the surface. In other words, the method may operate to perform parallel-beam scanning on the surface, where, depending on the control algorithm used, the scanning may comprise raster scanning and/or vector scanning of the surface.

In a more detailed embodiment of the invention using reflective media, the system may include an energetic beam source, operable to emit an energetic collimated beam, wherein the beam is operable to locally heat an illuminated region of the surface, and two optical devices, each comprising: a first reflective optical element, operable to rotate around a first respective axis; a second reflective optical element, operable to rotate around a second respective axis, wherein the first respective axis and the second respective axis are parallel; and at least one actuator coupled to the first and second reflective optical elements, and operable to respectively rotate the first and second reflective optical elements around the first and second respective axes in a coordinated manner such that the first and second reflective optical elements are parallel, wherein the optical device is operable to perform a parallel displacement of the beam in a respective direction, and wherein the respective direction is orthogonal to the beam.

The two optical devices may comprises a first optical device and a second optical device, where the first optical device may be operable to: receive the beam from the beam source; displace the beam in a first direction; and transmit the displaced beam to the second optical device. The second optical device may be operable to: receive the displaced beam from the first optical device; displace the beam in a second direction; and transmit the displaced beam to the surface, wherein the second direction is orthogonal to the first direction, and where the two optical devices are operable to direct the beam to illuminate and locally heat a sequence of specified regions of the surface to pattern the surface.

In another embodiment using a transmissive medium, the system may include an energetic beam source, operable to emit an energetic collimated beam, wherein the beam is operable to heat locally an illuminated region of the surface; and a parallel-beam scanner, comprising: a right prism comprising a refractive optical medium with a near face and a far face, wherein the optical medium has a specified index of refraction, wherein the right prism is operable to: receive the beam at the near face; transmit the beam to the far face; and emit the beam from the far face, wherein the emitted beam is parallel to the received beam. The system may also include at least one actuator coupled to the right prism, and operable to rotate the right prism about a specified axis to displace the beam in a specified direction, wherein the direction, the beam, and the axis are mutually orthogonal, where the parallel-beam scanner is operable to direct the beam to illuminate and locally heat a sequence of specified regions of the surface to pattern the surface.

BRIEF DESCRIPTION OF THE DRAWINGS

A better understanding of the present invention can be obtained when the following detailed description of the preferred embodiment is considered in conjunction with the following drawings, in which.

Figure 1:
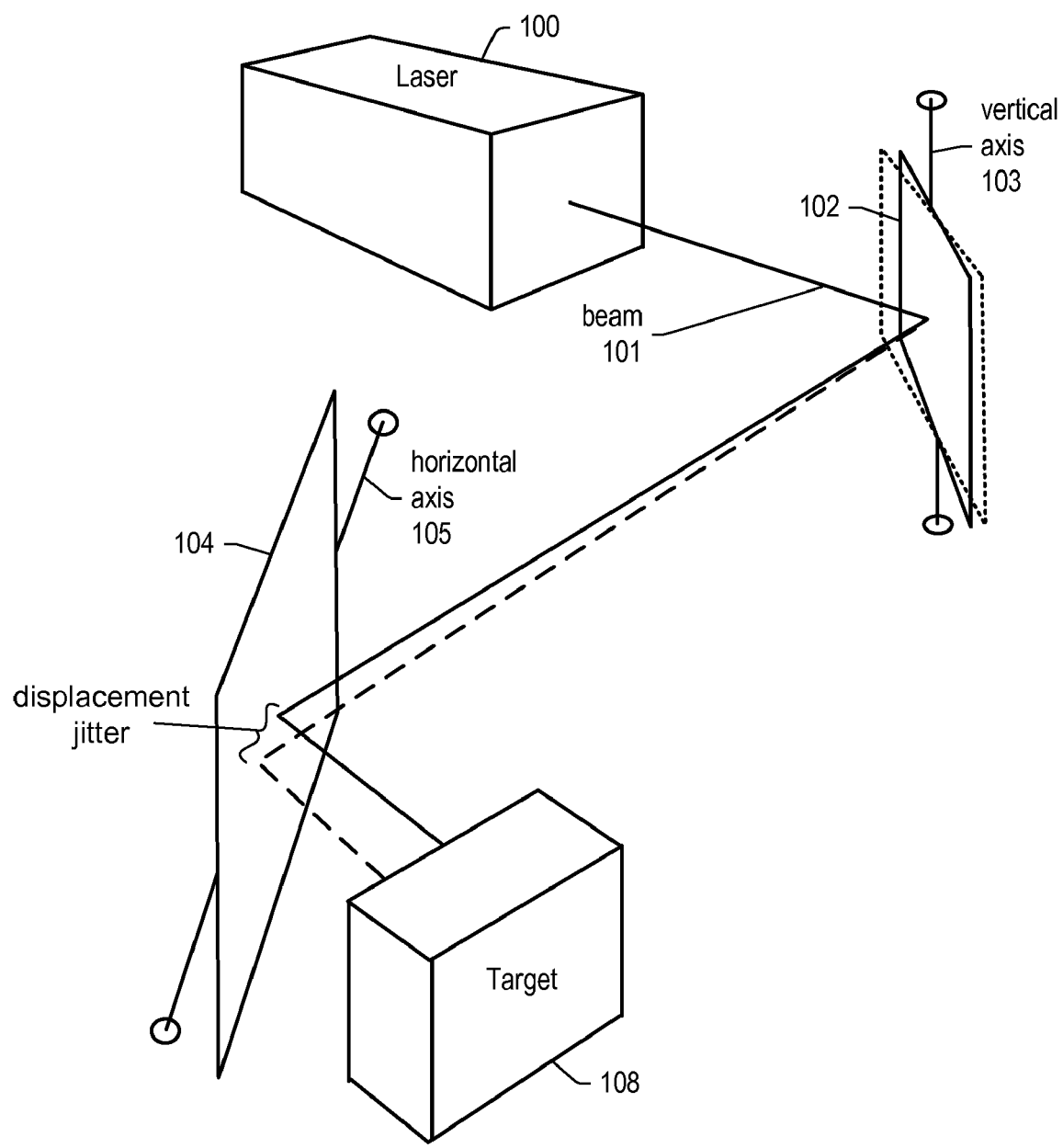
FIG. 1 illustrates a prior art system for scanning a surface, illustrating positional jitter or displacement jitter.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 5,346,850, titled "Crystallization and doping of amorphous silicon on low temperature plastic", issued on Sep. 13, 1994;

U.S. Pat. No. 6,680,485, titled "Thin film transistors on plastic substrates", issued on Jan. 20, 2004;

U.S. Pat. No. 6,509,217, titled "Inexpensive, reliable, planar RFID tag structure and method for making same", issued on Jan. 21, 2003;

U.S. Pat. No. 6,372,592, titled "Self-aligned MOSFET with electrically active mask", issued on Apr. 16, 2002;

U.S. Pat. No. 5,885,904, titled "Method to incorporate, and a device having, oxide enhancement dopants using gas immersion laser doping (GILD) for selectively growing an oxide layer", issued on Mar. 23, 1999;

U.S. Pat. No. 5,840,589, titled "Method for Fabricating Monolithic and Monocrystalline All-Semiconductor Three-Dimensional Integrated Curcuits," issued on Nov. 24, 1998;

K. H. Weiner et al., "Low-Temperature Fabrication of P+−n Diodes with 300-A Junction Depth," IEEE Electron Device Lett. vol. 13, no. 7, pp. 369-371 (July, 1992); and P. G. Carey et al., "Fabrication of Submicrometer MOSFET's Using Gas Immersion Laser Doping (GILD)", IEEE Electron Device Letters, Vol. EDL-7, No. 7, July 1986.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Galvanometer or Galvanometer Mirror—originally proposed and used by W. Thomson (Lord Kelvin), this is a type of actuator device in which a toroidal coil is situated between a pair of permanent magnet pole pieces with its plane parallel to the magnetic field of the magnet. For a given coil and magnet, the torque attempting to move the coil normal to the fixed field is proportional to the current through the coil. A mirror is affixed to the coil. The mirror may be rotated, where the ultimate rotational range is 90 degrees. Kelvin's significant contribution was shining a light on the mirror, which was then reflected to a scale.

Transmissive Medium—may be a lens or prism or other optical medium which passes, redirects, expands, or contracts a beam by transmission of the beam through the medium.

Reflective Medium—any optical device which translates, expands or contracts a beam by means of reflection, such as a mirror.

Parallel-Beam Scanning

It is the nature of a laser beam to exhibit a parallel character with extremely small divergence. In considering ways to perform scanning, this character may be used in a manner that delivers (sequentially) beams for each x-y position so that each is parallel to the optic axis, rather than divergent. The benefits of doing this are several. The array of beams may be fed into a beam shrinker, emerging as parallel beams of small cross section and higher specific power, approximately by the ratio of the area reduction. This control of power, or fluence, is a substantial advantage. Another major advantage is that shrinker-to-sample distance is rendered non-critical because the need to focus an image on the sample is eliminated.

Raster Scanning with Parallel Beams

Using time-separated parallel beams of radiation for the pixel-by-pixel delivery of a pattern to a surface brings the advantage that the "working space" between pattern generator and the patterned surface is non-critical and can be large. This in turn is beneficial when, for example, the surface to be patterned is in a confined space or a hostile environment (e.g. high-vacuum, toxic gas (such as arsine) or toxic surface dopant (such as arsenic)). Eliminating in this manner the need for lenses or focusing mirrors brings the further advantages that these elements do not compete for space with other experimental necessities near the surface, that the need for precise focusing is eliminated, and that exotic or short-lived materials are not needed in, for example again, lenses for short-wavelength radiation.

Figure 2:
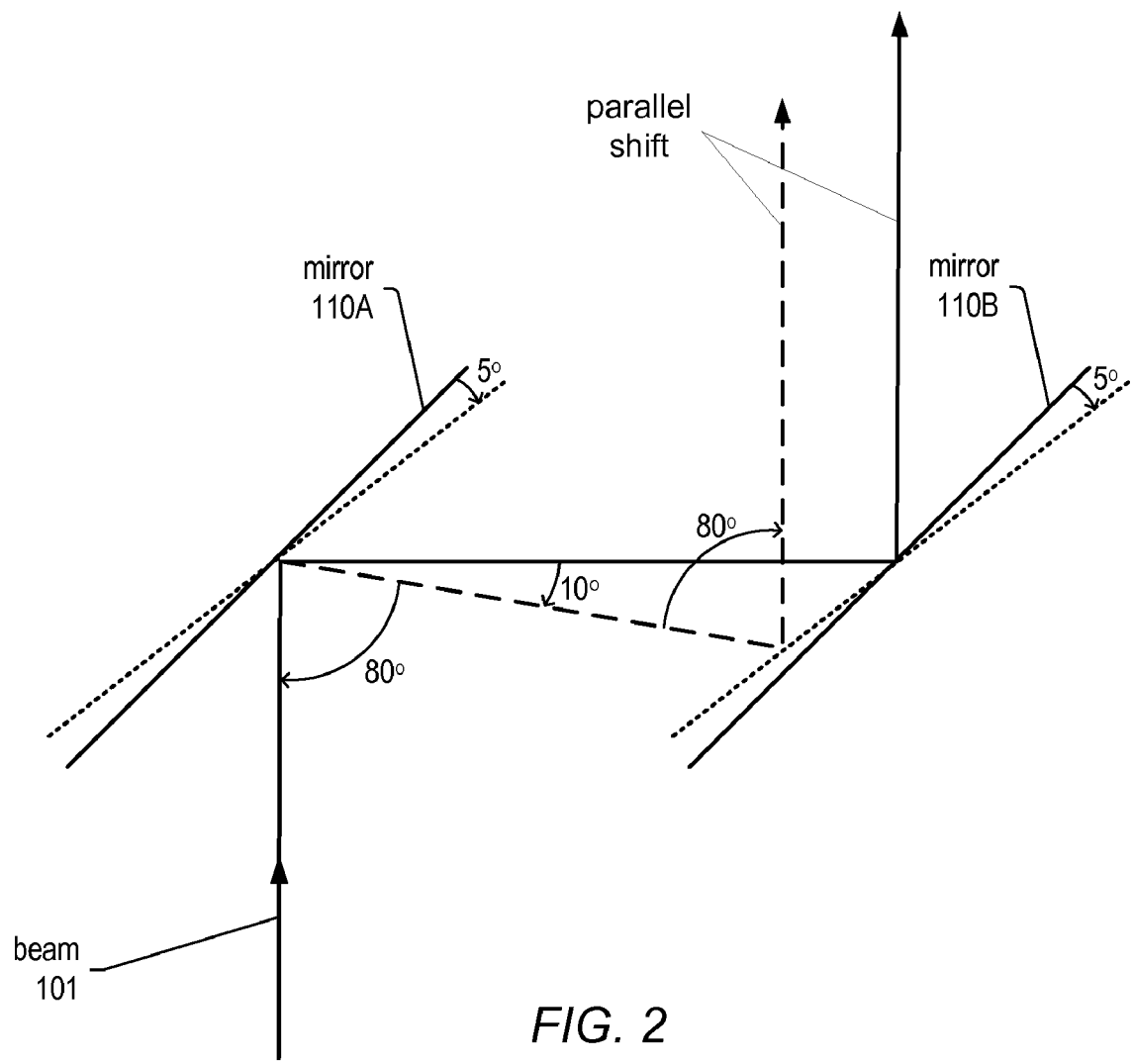
FIG. 2 illustrates parallel-beam scanning using a mirror pair, according to one embodiment.
Figure 3A:
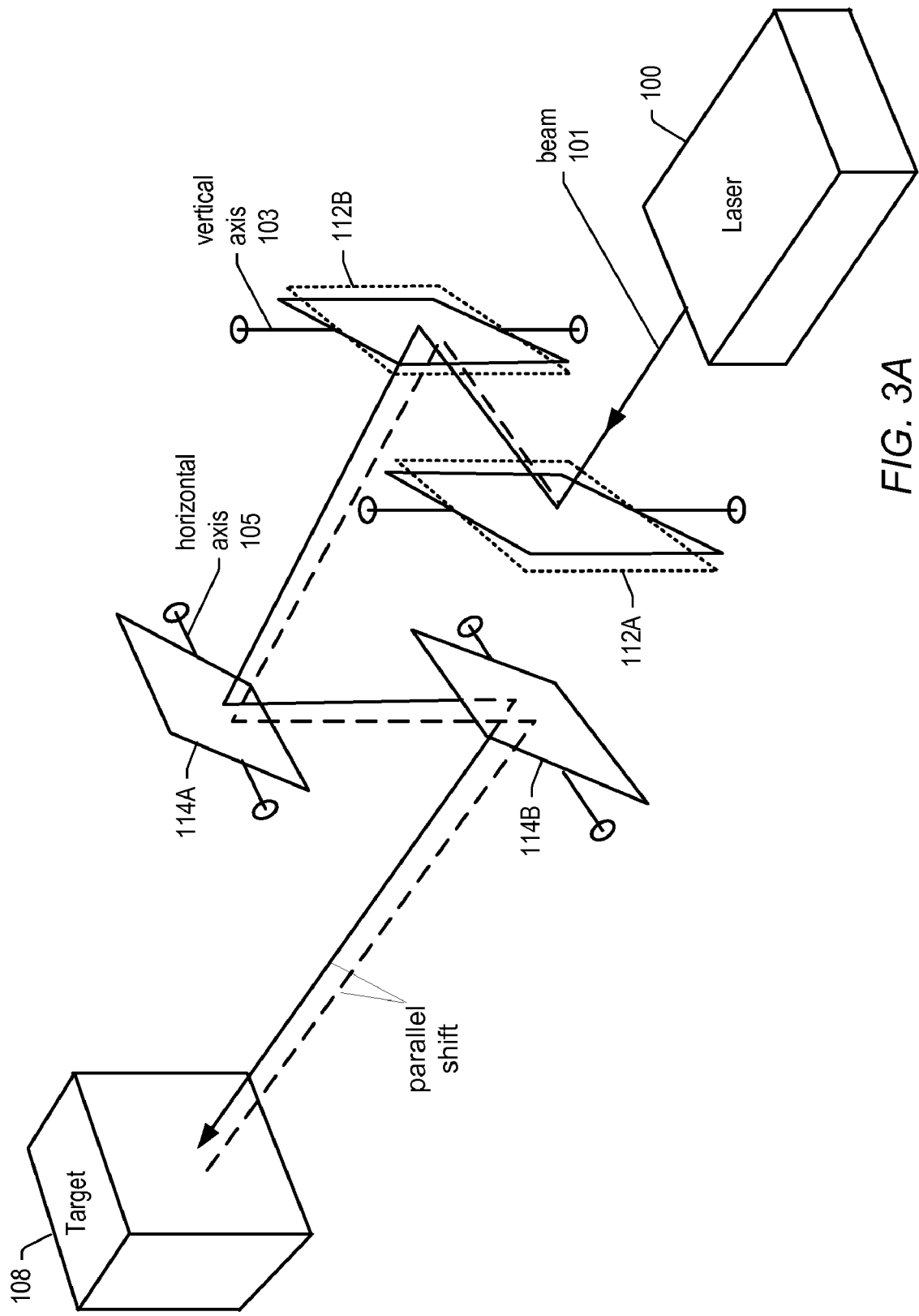
FIGS. 3A and 3B illustrate embodiments of a system for scanning a surface using parallel-beam scanning in two dimensions via two mirror pairs.
Figure 3B:
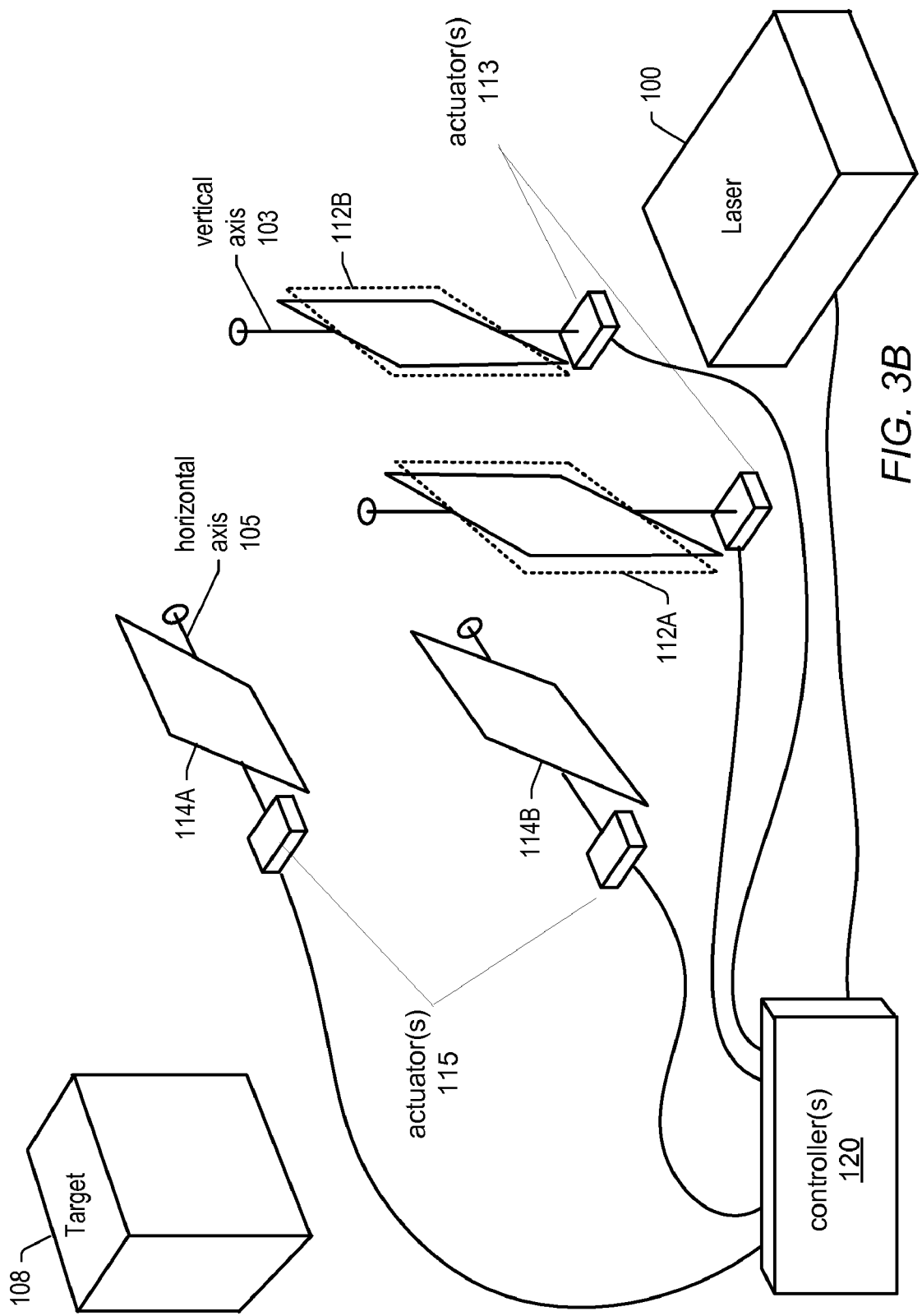

FIGS. 2-3B—Parallel-Beam Scanning Using Reflective Media

FIGS. 2-3B illustrate parallel-beam scanning using reflective media, according to one embodiment. More specifically, FIG. 2 illustrates parallel-beam scanning in one dimension using reflective media, while FIGS. 3A and 3B illustrate a scanning system comprising a parallel-beam scanner based on the principles of FIG. 2.

FIG. 2—Parallel-Beam Scanning with Dual Mirrors

FIG. 2 illustrates a technique for parallel-beam scanning in one dimension using two parallel mirrors operated in a coordinated manner, according to one embodiment of the invention. As FIG. 2 shows, a beam 101 may impinge on a first mirror 110A which is rotatable about an axis. The first mirror 110A may reflect the beam to a second mirror 110B, also rotatable about an axis parallel to that of the first mirror. The second mirror 110B may then reflect the beam to a desired target (not shown).

In this figure, solid lines denote the mirrors in their neutral positions, which in some embodiments may be at 45 degrees with respect to the beam, and may correspond to beam incidence at the center of a target, as well as the corresponding beam path. The dashed lines indicate the mirrors rotated from their neutral positions by 5 degrees, as well as the corresponding shifted beam path. Note that due to the well-known principle that for a reflector the angle of incidence is equal to the angle of reflection, since the two mirrors are rotated synchronously and by the same amount, the resulting shifted beam (dashed line exiting second mirror) that exits the apparatus is always parallel to the original (neutral position) beam (solid line exiting second mirror). Said another way, the fact that the two mirrors are rotated in a coordinated manner such that they remain mutually parallel results in a parallel displacement of a beam normal (orthogonal) to the axes of rotation of the mirrors. Note that the displacement is also normal (orthogonal) to the beam itself. Note also, that the displaced beam is parallel to the original beam.

It should be noted that while the system shown in FIG. 2 operates to displace a beam in only one direction, an additional pair of mirrors (with axes of rotation orthogonal to the axes of rotation of the first set of mirrors) may be used to displace the beam in a second dimension. Thus, by deploying such coordinated mirror pairs in series, parallel-beam scanning over a plane (e.g., flat) surface may be performed.

An exemplary embodiment of such a system is described below with reference to FIGS. 3A and 3B.

Note that the parallel shift or displacement of the beam increases as the rotational angle increases, and decreases as the angle decreases. The useful range of angles should avoid the extremes, however, i.e., near 0 degrees and near 90 degrees. Note also that as displacement is increased by this method, mirror 110B must be increased in lateral size to ensure that it receives and reflects the beam from mirror 110A. The vertical dimension of mirror 110B, however, need not be increased. Further, mirror 110A can be made quite small, because the source beam will always be aimed at its center.

It should be further noted that for a given lateral dimension in mirror 110B and increasing mirror separation, rotational range may have to be restricted so that the beam reflected from mirror 110A does not miss mirror 110B. For any specific choice of some of these variables, allowable values and ranges for the remaining variable or variables may be determined by employing a diagram like that of FIG. 2. No effort has been made to show such details in FIG. 2 because its function is to display the principles of the invention.

FIGS. 3A and 3B—Exemplary Patterning System Using Reflective Media

FIGS. 3A and 3B are perspective diagrams illustrating an exemplary patterning system utilizing reflective media, according to one embodiment of the invention. As FIG. 3A shows, this embodiment includes a laser 100, a first pair of mirrors 112A and 112B, each operable to rotate about a respective vertical axis 103, and a second pair of mirrors 114A and 114B, each operable to rotate about a respective horizontal axis 105, as well as a target 108. Thus, this embodiment includes two dual-mirror sets 112 and 114. As shown, beam 101 exits the laser, impinges upon mirror 112A, is reflected to mirror 112B, then to mirror 114A, then to mirror 114B, which reflects the beam to target 108. The positioning of the mirror pairs determines the neutral lateral displacement (112A/112B), e.g. 1 centimeter, and the neutral vertical displacement (114A/114B), e.g. 1 centimeter. In preferred embodiments, the target may be placed such that the neutral position of the system (e.g., 45 degrees with respect to the incident beam direction) corresponds to beam incidence at the center of the target.

Note that FIG. 3A shows the first of the dual-mirror sets, specifically, mirrors 112A and 112B, in their neutral positions (e.g. at 45 degrees) indicated by solid lines, and with a coordinated deflection as well (e.g. at 5 degrees from neutral, or 50 degrees from the beam, as illustrated in FIG. 2), indicated by dashed lines. Mirrors 112A & 112B thus serve to determine the lateral displacement, and mirrors 114A serve to determine the vertical displacement. From the second of the four mirrors onward, i.e., mirror 112B, the resulting beam paths are parallel. That is, the lateral displacement of the beam just after leaving the second mirror equals the displacement of the beam just before striking the target. The third and fourth mirrors (second dual-mirror set 114) are in their neutral positions (e.g. 45 degrees). Note that an angular deflection by this mirror pair would cause translation up or down of the target strike points from the neutral position while maintaining the beam-parallelism conditions outlined above. The deflection of the beam is indicated by two beam paths that diverge at mirror 112A. The solid path indicates the beam path when all mirrors are in their neutral positions, while the dashed path indicates the resulting path when the first pair of mirrors are configured for a lateral deflection, indicated by the dashed mirror positions in FIG. 3A. Note the parallel displacement of the beam shown and labeled accordingly. This type of parallel shift, e.g., in each of two dimensions, may thus facilitate accurate scanning of a plane target.

Continuing the discussion of mirror size from the description of FIG. 2, it is noted that mirror 114A should preferably approximate the size and proportions of mirror 112B, but with the larger dimension in the direction of the rotation axis this time. Finally, that larger dimension should be chosen for both dimensions of mirror 114B, since its coverage in a particular design, even when fully rotated, must cover the entire target field when mirror 114B is projected onto the target along a normal to the target plane.

Additionally, there may be other considerations. For example, near-grazing incidence should be avoided because it makes beam displacement too critically dependent on angle of rotation. Similarly, large separations between the mirror pairs is to be avoided since this would reduce the range of angles to be controlled, thus making precise angular control critical. It should be noted that no effort has been made to show mirror size and shape details in FIG. 3A because its function is to display the principles of the invention.

Thus, in one embodiment of the present invention, a highly collimated beam of radiation from a laser (including ultraviolet (UV) producing lasers such as Excimer lasers, UV lamps followed by a beam collimator, one or more laser diodes, etc.) may be used, although it should be noted that other energetic beams and beam sources are also contemplated, including for example, lasers of various frequencies, etc. Reflection from two pairs of coordinated moving dual mirrors preferably causes the beam to sweep across the target "field." ON-OFF control of the beam may be used to determine which pixels (i.e., which regions of the target) in the sweep are irradiated and which are not.

In some embodiments, the beam may be shut off while the mirrors assume positions to start another sweep of the field from the original edge of the field, where the sweep may be vertically displaced from the first by the width of the beam. Successive sweeps may be performed with further respective vertical displacements, as is well known in the art of raster scanning. When the full field has been scanned, the irradiated pixels create the desired two-dimensional pattern. Note that in various embodiments, the On-Off control may be performed either by turning the laser itself on and off, by using a shutter arrangement such as is done in ordinary optical cameras, or via any other means as desired.

While the above description is directed to a raster scan of the target, in other embodiments, vector scanning may be performed. In other words, rather than scanning a series of rows, e.g., from top to bottom, or columns e.g., from left to right, the system may operate to scan a specified contour (curve) or series of contours, as is well-known.

Note that in some embodiments, the order of the mirrors pairs may be switched such that the horizontal displacement is performed prior to the vertical shift. Thus, one or more pairs of coordinated mirrors may be used to implement a parallel-beam scanner for treating or patterning a surface.

It may be desirable to employ a beam size manipulator between the second mirror pair and the target, for example, to reduce the beam size for patterning a very small area, or to increase the fluence so as, for example, to highly heat and/or melt the surface. Such a beam size manipulator may be located inside the chamber containing the target (e.g. controlled environment at a specified pressure such as a high vacuum and/or a particular set of environmental parameters such as temperature, humidity, gas content) used to process the target, which may be advantageous so as to reduce the fluence of the energetic beam through the window between the external environment and the controlled environment (e.g. vacuum) chamber.

FIG. 3B illustrates the system of FIG. 3A, but with the addition of controllers 120 and actuators 113 and 115. As FIG. 3B shows, the controller or controllers may be coupled to and control the actuators and the beam source, e.g., laser 100. For example, the controller or controllers 120 may operate to turn the laser on and off as needed, and may also move each mirror pair in a coordinated manner to achieve the desired displacement of the beam (while maintaining the parallel nature of the beam as described above). In some embodiments, the controller or controllers may be implemented in any of a variety of ways, including, for example, using computers, embedded devices, and so forth.

As FIG. 3B shows, in this embodiment, actuators or actuator pairs 113 and 115 are respectively coupled to each mirror pair to move the mirrors in a coordinated manner per control signals provided by controller(s) 120. In various embodiments, an actuator may be provided per mirror or per mirror pair. Note that any type of actuators may be used as desired, including for example, galvanometers, stepping motors, servos, and thermally or voltage controlled "shape memory" alloy-based devices, piezoelectric, and capacitive devices, among others.

It is noted that in preferred embodiments, the dual galvanometer mirrors of the system have an edge dimension that is about 40% larger than that of the target (heat-treated surface). This is because in the neutral position, e.g. 45 degrees, sin(45 degrees)=0.7071; thus need 1/0.7071 or about 1.414 (41.4% larger).

With respect to the application of a UV laser energy source for semiconductor (e.g. silicon) surface heating, and the initial shaping of the laser beam before it strikes the dual mirrors of the present invention, mirror optics may be advantageous, especially in terms of useful life when used with UV, especially lower wavelength (higher energy) UV. One may exploit design principles employed in reflective telescopes, as illustrated in FIGS. 2-3B. This has the advantage of straight-ahead optical path axis.

With this system, a pattern can be created which is energetic enough to melt silicon with a laser of vastly less instantaneous power than a high-power excimer laser by raster or vector scanning with a beam of small cross-section, taking advantage of the fact that scanning time of a few seconds is eminently compatible with the patterning of semiconductor wafers (one application for this design). Commercial mirror systems to realize the dual mirrors are directly applicable in this technique.

Figure 4:
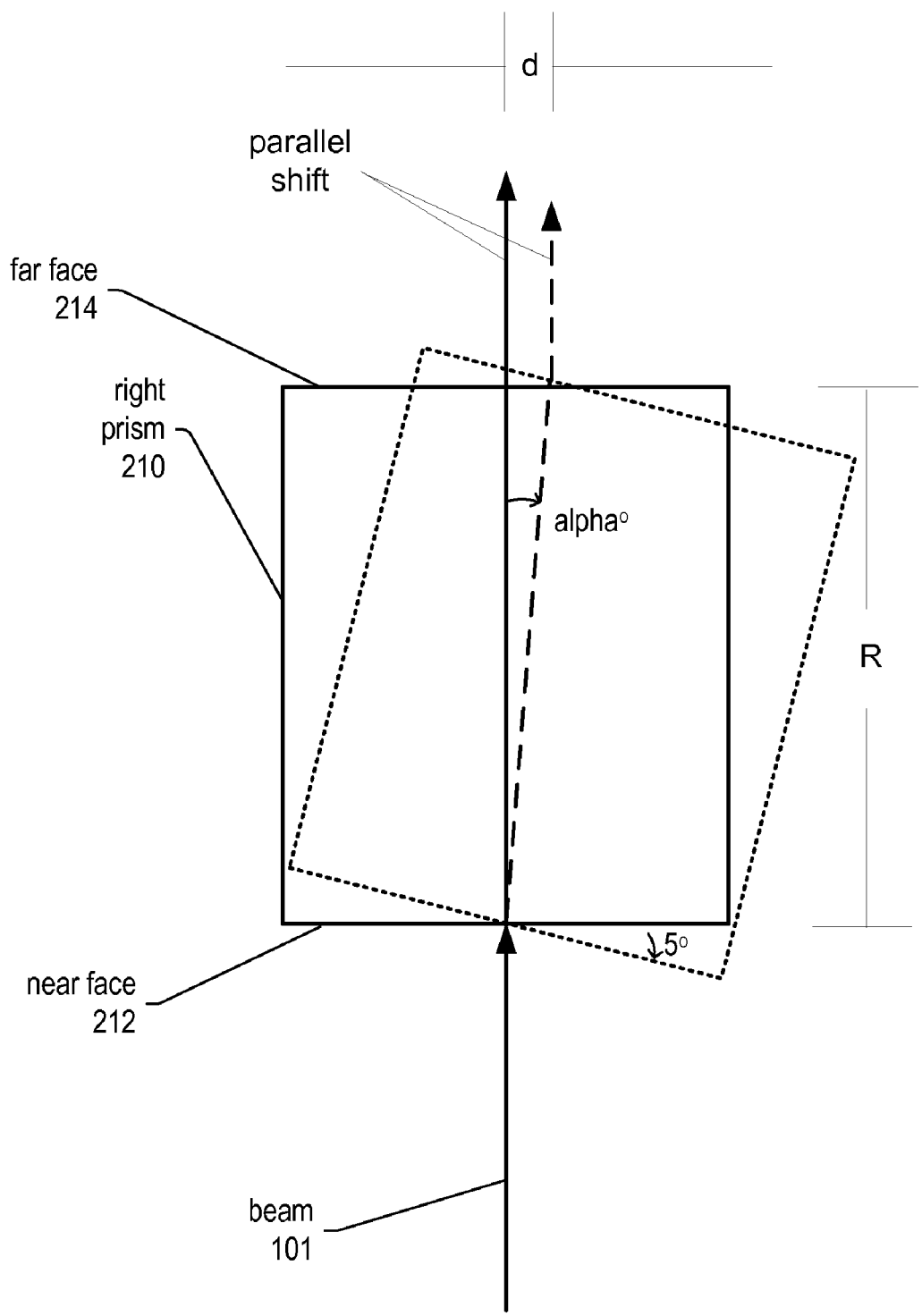
FIG. 4 illustrates parallel-beam scanning using a transmissive medium, specifically, a right prism, according to one embodiment.
Figure 5:
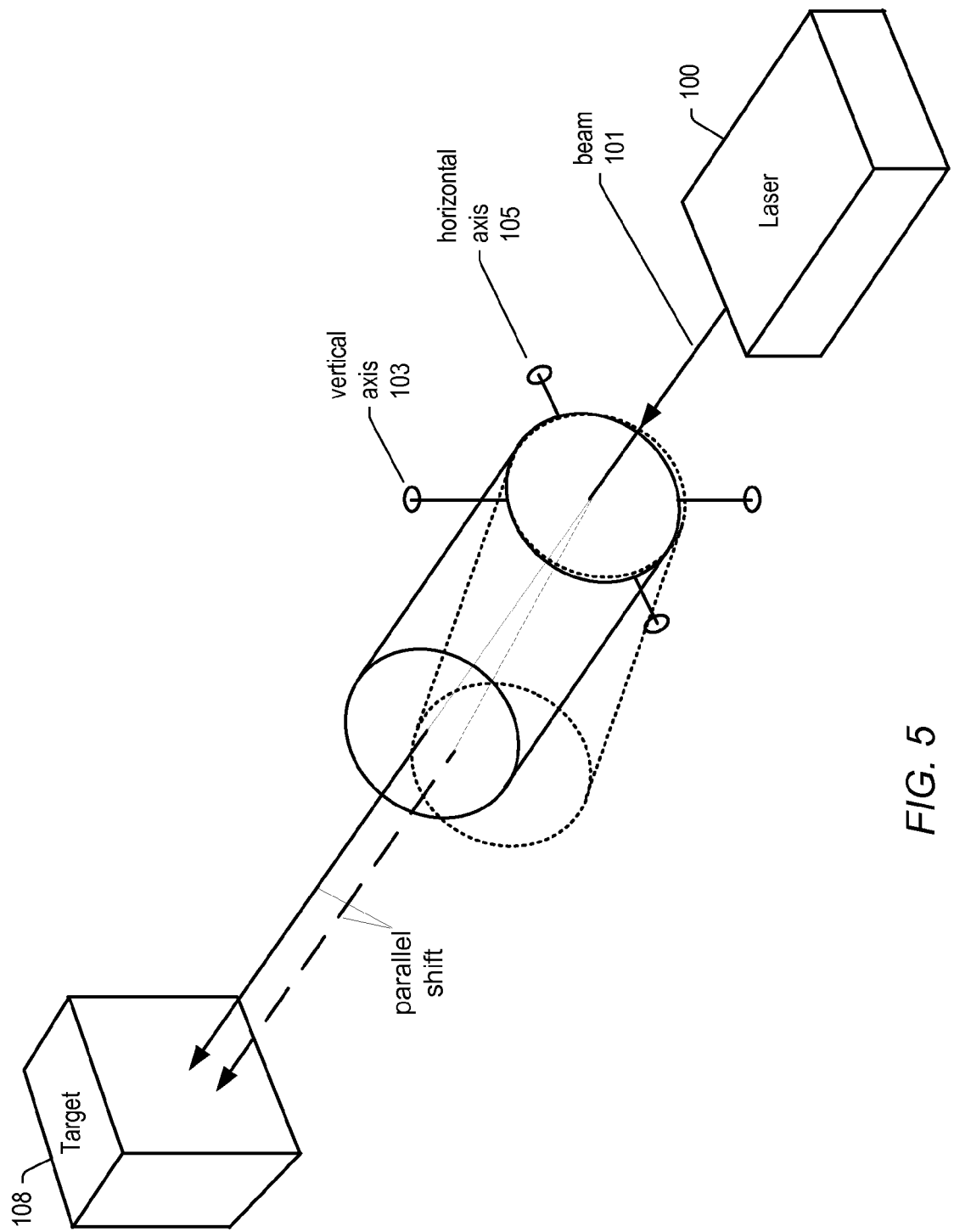
FIG. 5 illustrates embodiments of a system for scanning a surface using parallel-beam scanning in two dimensions via a right prism.

FIGS. 4-5—Parallel-Beam Scanning Using Refractive Media

FIGS. 4 and 5 illustrate parallel-beam scanning using transmissive, i.e., refractive, media, according to one embodiment. More specifically, FIG. 4 illustrates parallel-beam scanning in one dimension using transmissive media, while FIG. 5 illustrates a scanning system with a parallel-beam scanner based on the principles of FIG. 4.

FIG. 4—Parallel-Beam Scanning with Right Prism

FIG. 4 illustrates a technique for parallel-beam scanning in one dimension using a refractive transmissive medium, specifically, a right prism of glass or other refractive optical medium. Note that as used herein, the term "prism" refers to any solid of extrusion (constant cross-section) made of a transmissive medium, e.g., glass. In a preferred embodiment, the optical medium has a high index of refraction, as will be explained below. As is well known, a right prism comprises an "extruded" solid of constant cross-section with parallel end surfaces, referred to as near and far faces of the prism, normal to the long axis of the prism. Note that the prism may be of any cross-sectional shape (referred to as the prism shape) desired. For example, in one embodiment, the prism may have a shape geometrically similar to the target shape, e.g., the prism may have a square cross-section if the target is a square silicon wafer. For purposes of illustration, a cylindrical right prism is used in the embodiments described herein. The ends of the cylinder are plane, parallel, and polished.

Means are provided that permit the cylinder to rotate about orthogonal X and Y axes that intersect mutually, meeting at the midpoint of the cylinder axis. Let the beam of radiation for the neutral position of the cylinder coincide with the cylinder axes. The point, then, at which the beam strikes the entry face is fixed by simple geometry—the length of the cylinder and the angle of rotation. The path of the beam in the interior of the cylinder is determined by an additional factor, the index of refraction of the transmissive medium. The exit point of the beam from the exit face is dependent on both factors, geometry and index. Note that transmissive materials for UV radiation may pose a problem, and one way to increase beam displacement, is to increase cylinder length As FIG. 4 shows, beam 101 may impinge on a near face 212 of prism 210. Note that the prism is rotatable about an axis, where in this particular case is normal to the plane of the figure. In this figure, solid lines denote the prism in its neutral position, as well as the corresponding beam path. As shown, the prism 210 in its neutral position results in the beam 101 traveling straight through the center of the prism and exiting the far face 214 of the prism substantially unchanged. The dashed lines indicate the prism rotated from its neutral position by 5 degrees (not drawn to scale), as well as the corresponding shifted beam path. Note that due to the well-known principle embodied by Snell's Law:

$$n_1 \sin \theta_1 = n_2 \sin \theta_2 \quad (1)$$

where $n_1$ is the refractive index of a first optical medium, $n_2$ is the refractive index of a second optical medium, $\theta_1$ is the angle of incidence (with respect to the surface normal) of light in the first medium impinging on a boundary with the second medium, and $\theta_2$ is the angle of propagation (with respect to the surface normal) of the transmitted beam in the second medium, the beam will exit the prism parallel to the beam direction at entry.

Thus, in the embodiment shown in FIG. 4, if we assume a refractive index of the first medium (e.g., air) to be 1, and the refractive index of the second medium (e.g., glass) to be 1.5, the angle of propagation in the prism is approximately:

$$\theta_2 = \arcSin((n_1/n_2)*\sin \theta_1) = \arcSin(0.66667*\sin(5°)) = 0.0582 \quad (2)$$

where the "equal" signs indicate approximate equality. Since the two faces are rotated synchronously and by the same amount with respect to the incident beam, the resulting shifted beam that exits the prism is always parallel to the original (neutral position) beam. Note that the shift is always normal to the beam itself. Using standard trigonometric relations, and letting R denote the length of the prism, the displacement d is:

$$d = [R*\sin(\theta_1 - \arcSin((n_1/n_2)*\sin \theta_1)] / \cos(\arcSin((n_1/n_2)*\sin \theta_1)) \quad (3)$$

which, in the above case of a 5 degree rotation of the prism, and assuming the length of the prism R=1, is approximately 0.0291. Of course, by increasing R and/or the index of refraction of the prism, the amount of displacement corresponding to a given prism rotation may be increased.

It should be noted that while the system shown in FIG. 4 operates to shift a beam in only one direction, specifically, in the direction of the prism rotation, with a suitable actuator or actuators, the prism may be rotated about an arbitrary axis, e.g., as a combination of an X rotation and a Y rotation, thus facilitating parallel-beam shift or displacement in two dimensions. An exemplary embodiment of such a system is described below with reference to FIG. 5. It should also be noted that while the embodiments described with respect to FIG. 4 and FIG. 5 rotate the prism about a pivot point located in the center of the near face of the prism, in other embodiments, the pivot point may be located at the center of the prism, i.e., at the center of mass, i.e., the midpoint of the prism's primary axis, or elsewhere as desired. In other words, in various preferred embodiments, the axis or axes or rotation may be located at any point along the centerline or primary axis of the prism.

FIG. 5—Exemplary Patterning System Using Refractive Media

FIG. 5 is a perspective diagram illustrating an exemplary patterning system utilizing refractive media, according to one embodiment of the invention. As mentioned above, in preferred embodiments, means are provided that permit the prism (e.g., the cylinder) to rotate about two mutually orthogonal axes that intersect each other and that also intersect a "pivot point" on the prism's (e.g., the cylinder's) axis, for example, the midpoint, or, alternatively, the center of the near face of the prism, although other pivot points are also contemplated. A laser beam or other collimated beam of radiation is fed into one face of the cylinder and out the other. Rotational manipulation of the prism (e.g., cylinder) about the aforesaid axes causes deflection (without divergence) of the beam in two dimensions, so that raster scanning (and/or vector scanning) on a target surface can be achieved.

As FIG. 5 shows, this embodiment includes a laser 100, a right prism 210, operable to rotate about a vertical axis 103 and a horizontal axis 105, and target 108. As shown, beam 101 exits the laser, impinges upon the near face 212 of the prism, is refracted to the far face 214 of the prism, and exits the prism to target 108.

Note that FIG. 5 shows the prism 210 in its neutral position (solid lines) and with a deflection or rotation as well (dashed lines). Note that upon exiting the prism the beam path is parallel to the incident or emitted beam. That is, the lateral displacement of the beam just after leaving the far face of the prism equals the displacement of the beam just before striking the target. The deflection of the beam is indicated by two beam paths that diverge at the point of incidence on the near face 212. The solid path indicates the beam path when the prism is in the neutral position, while the dashed path indicates the resulting path when the prism is rotated, indicated by the dashed prism position in FIG. 5. Note that in this exemplary embodiment, the prism has been rotated about both X and Y axes (about a pivot point located at the center of the near face of the prism), where the corresponding the parallel shift of the beam is shown and labeled accordingly. This type of parallel shift, e.g., in each of two dimensions, may thus facilitate accurate plane scanning of a target. It should be noted that in some embodiments, rather than X and Y rotations used in combination, an actuator (or actuators) may operate in spherical coordinates, e.g., with a direction of rotation, and an angle of rotation, together specifying the rotation and corresponding two dimensional beam shift. Other rotational representation and control schemes may be used as desired.

Similar to the reflective media based embodiment described above with reference to FIGS. 3A and 3B, in one embodiment of the present invention, a highly collimated beam of radiation from a laser (e.g., a UV-producing laser such as an Excimer laser) may be used, although it should be noted that other energetic beams and beam sources are also contemplated, including for example, lasers of various frequencies, UV lamps with collimators, one or more laser diodes, etc. Appropriate rotation of the prism preferably causes the beam to sweep across the target "field." ON-OFF control of the beam may be used to determine which pixels (i.e., which regions of the target) in the sweep are irradiated and which are not.

In some embodiments, the beam may be shut off while the prism assumes a position to start another sweep of the field from the original edge of the field, where the sweep may be vertically displaced from the first by the width of the beam. Successive sweeps may be performed with further respective vertical displacements, as is well known in the art of raster scanning. When the full field has been scanned, the irradiated pixels create the desired two-dimensional pattern. Note that in various embodiments, the On-Off control may be performed either by turning the laser itself on and off, by using a shutter arrangement such as is done in ordinary optical cameras, or via any other means as desired.

As also described above, while the above description is directed to a raster scan of the target, in other embodiments, vector scanning may be performed. In other words, rather than scanning a series of rows, e.g., from top to bottom, or columns e.g., from left to right, the system may operate to scan a specified contour (curve) or series of contours, as is well-known.

Although not shown, the system of FIG. 5 is assumed to include a controller and one or more actuators to rotate the prism and/or regulate the beam. Note that, as with the reflective system, any type of actuators may be used as desired, including for example, galvanometers, stepping motors, servos, and thermally or voltage controlled "shape memory" alloy-based devices, among others.

Thus, a parallel-beam scanner according to the present invention may be implemented using reflective or refractive optical media. It should be noted that in further embodiments, combinations of these two techniques may also be used as desired.

In a preferred embodiment, the system may comprise a scanned UV-laser-beam system for the patterned heat-treating of a surface, e.g., a silicon surface, such as a monocrystalline silicon wafer. For example, the beam may scan the surface using the techniques described herein, heating (and possibly melting) successive spots or pixels to facilitate rapid and efficient absorption of dopants, e.g., from a gas, into the surface in a specified pattern, as described above with respect to the GILD method of deposition. In some embodiments, the system and methods disclosed herein may be used in conjunction with, or as part of, a single-pumpdown fabrication system, as disclosed in U.S. Pat. No. 5,840,589, which was incorporated by reference above. Note that the epitaxial growth of semiconductor layers and specific dopant layers can be done with any technique which accomplishes the desired epitaxial growth, such as sputter-epitaxy as described in U.S. Pat. No. 5,840,589 or molecular beam epitaxy (MBE) as is known in the art. Similarly, material removal can be accomplished by techniques such as ion milling such as described in U.S. Pat. No. 5,840,589 or other known techniques such as reactive ion etch (RIE).

Some Variants of the System

As noted above, various different techniques, components, and configurations may be used in embodiments of the present invention. For example, in some embodiments, the beam may be reduced (decreasing the spot size and increasing the fluence of the beam) and/or expanded (increasing the spot size and decreasing the fluence of the beam) prior to target incidence. Devices for manipulating the beam size are generally referred to as beam expanders and beam shrinkers. Note that the beam may be reduced and/or expanded prior to or after (or both), passage through the parallel-beam scanner (see FIGS. 3A, 3B, and 5).

Figure 6A:
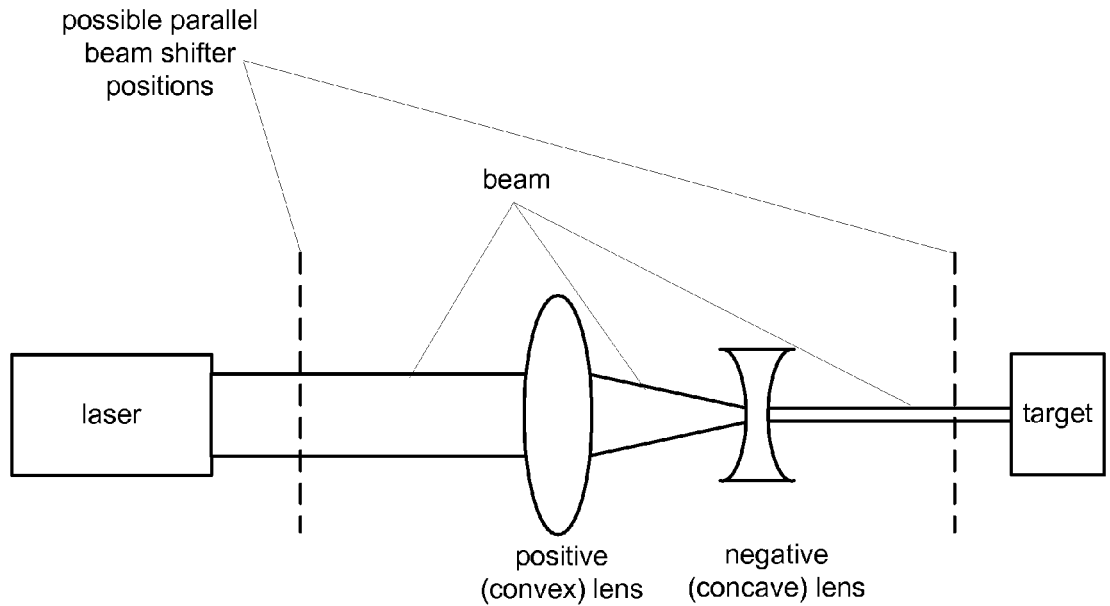
FIGS. 6A and 6B illustrate exemplary beam size manipulators using reflective and refractive media, respectively.
Figure 6B:
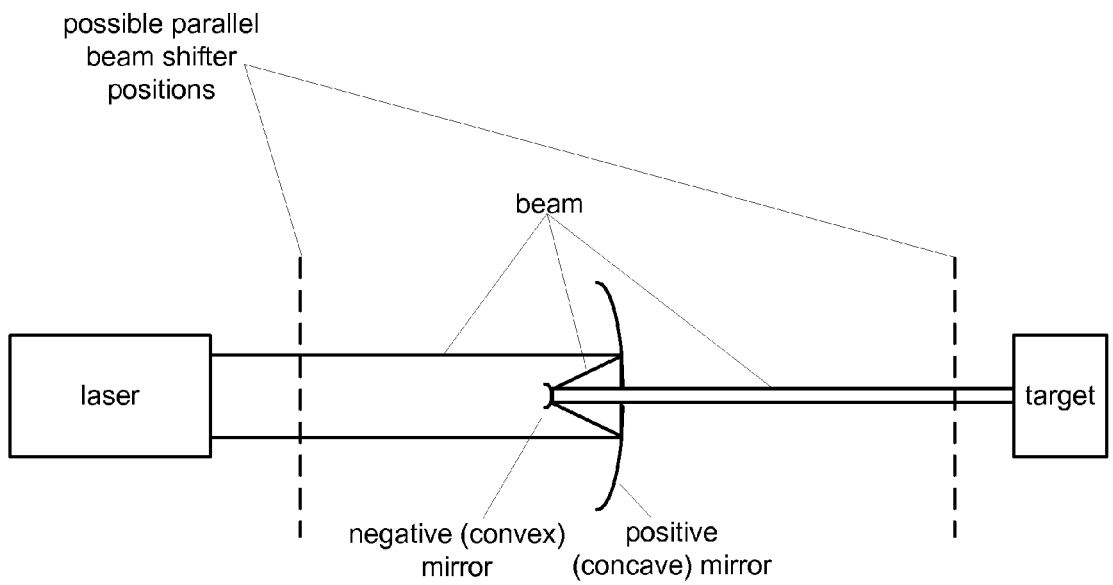

FIGS. 6A and 6B illustrate exemplary beam reduction systems that may be used in or with embodiments of the present invention. More specifically, FIG. 6A illustrates a beam reducer that uses lenses, and FIG. 6B illustrates a beam reducer that uses mirror.

As FIG. 6A shows, in this embodiment, a positive or convex (convergent) lens and a negative or concave (divergent) lens are place in series, where the two lenses are matched to negate or revere each other's optical effects. A laser operates to provide a beam incident upon the positive lens. As is well known in the art of optics, the positive lens operates to converge or focus the beam, thereby reducing the beam width, while the negative lens operates to diverge or expand the beam. Thus, upon exit from the positive lens, the beam converges toward the focal point of the lens. However, before the focal point is reached, the negative lens receives or intercepts the converging beam and halts the beam convergence, converting the converging beam back to a parallel-beam, but with a smaller beam width (and thus greater fluence) than when originally emitted from the beam source, as FIG. 6A clearly shows. Thus, the beam size manipulator of FIG. 6A functions as a beam shrinker.

FIG. 6A also indicates possible positions for the parallel-beam scanner described above with reference to FIGS. 3A, 3B, and 5. As may be seen, the parallel-beam scanner assembly may be located prior to, or after, the beam shrinker. However, due to the degrading effects of high fluence upon optical elements (mirrors or lenses), it may be preferable to place the parallel-beam scanner prior to the beam shrinker, so that the beam incident upon the mirrors has not yet been reduced or intensified.

Thus, a mated pair of negative and positive lenses, shown in mirror form in FIG. 6A, may be employed for the purpose of changing the diameter of a collimated parallel beam. For use in patterning semiconductor wafers, the choice of a mated pair is used to adjust the laser beam fluence, which is important to effect the heating for solid-phase diffusion, or heating to melting point for liquid-phase diffusion (e.g. as in GILD).

FIG. 6B illustrates one embodiment of a beam shrinker that is a mirror analog to the lens-based system of FIG. 6A. As FIG. 6B shows, in this embodiment, positive and negative mirrors corresponding respectively to the positive and negative lenses of FIG. 6A are placed in the beam path. Note that in the case of mirrors, a positive mirror (with a positive focal length) is actually concave, and is thus convergent, and a negative mirror (with a negative focal length) is convex, and is thus divergent, as shown. Note also that the positive mirror has a hole As indicated, the beam emitted from the laser impinges upon the positive mirror and is reflected as a converging beam to the negative mirror. The negative mirror reflects the converging beam, halting the convergence. The reflected (and reduced) beam, now parallel again, then passes through the hole in the positive mirror and continues toward the target.

As with the system of FIG. 6A, a parallel-beam scanner may be placed before or after the beam shrinker assembly as desired, as indicated by the two dashed lines labeled accordingly.

Thus, beam shrinkers or expanders (or any other types of beam manipulator) may be used in conjunction with embodiments of the parallel-beam scanner described herein.

In further embodiments of the present invention, the parallel-beam scanner may be used in conjunction with any other diffusion schemes and techniques as desired. For example, rather than Gas-Immersion Laser Doping (GILD), solid or liquid phase diffusion may be effected via localized heating and/or melting of the surface via embodiments of the parallel-beam scanner disclosed herein, thereby obviating the complexities of managing gasified dopants. Note that in preferred embodiments, the surface is a silicon surface, e.g., a monolithic silicon crystal, although the techniques described herein are broadly applicable to the scanning of any other type of surface, as well.

Some Advantages of Embodiments of the Present System

One advantage of the present invention according to some embodiments is that low-cost, compact, off-the-shelf components may be utilized that can operate inside a vacuum system. Alternatively, the laser and optionally some of the optics may be outside of the vacuum system, and the beam transmitted into the vacuum system through a UV-transmissive and UV-tolerant window. This configuration may work particularly well if final beam sizing, e.g., reduction (which increases the beam intensity), occurs either just outside the window, or entirely within the vacuum system. Note that with this configuration, the optical power density per unit area, i.e., the fluence, at and through the window is much less than that needed to cause the solid-phase diffusion effect, or to melt the surface of the substrate, or other thermal-related effects. In other words, the optical power is spread out over a larger area as it passes through the window, thus improving the effective life of the window. This is particularly facilitated by the scanning approach described herein, as opposed to "whole chip" or "whole wafer" exposure techniques (e.g., using masks) typically used in surface patterning processes such as chip manufacturing, since the total fluence needed is only that which will melt one spot-size or pixel of target surface. Moreover, leaving the beam reduction step until inside the vacuum chamber further reduces the degradation effects of high fluence on the window, as well as reducing the effect of small dust particles outside the vacuum—only inside the vacuum must the environment be clear of micron-sized particles; outside, prior to final beam reduction, elimination of larger (e.g. 10 micron particles) may be sufficient.

Another advantage of this approach over projecting a patterning image is that the energy per unit time (i.e., power) required from the radiation source is reduced substantially, e.g., by a factor equal to the number of pixels in the image, as compared to a system in which a single source must illuminate the entire field simultaneously. In many applications, this factor may be quite large, given that in the systems needed for LSI, VLSI and ULSI patterning, the number of pixels is at least one million. This reduction of necessary beam source power may allow low- to mid-powered beam sources to be used rather than the high-power sources generally required for patterning processes, and thus may be substantially less expensive and safer to use. Moreover, any lenses (or windows) that may be used in the system may remain usable longer due to decreased degradation normally caused by high fluence of the incident radiation.

Thus, using coordinated paired mirrors may eliminate the above described problems related to displacement jitter and planar scanning, and may provide additional benefits as well. Some benefits of embodiments of the present system and method include, but are not limited to, the following:

1. The system may treat an area measuring a fraction of a cm2 to a few cm2;
2. The system may have a megapixel to gigapixel or greater resolution (i.e. capable of being used to sub-micron effective scanning spot size);
3. The beam may be of high intensity or fluence (sufficient to melt silicon);
4. The process may be driven by a low-power to medium-power laser, e.g., a milliwatt laser;
5. The system may use optics that:
   a. may be lens-free, i.e., using reflective media (e.g., mirrors) only (see FIG. 3A);
   b. may be mirror-free, i.e., using transmissive media only (see FIG. 5);
   c. have a wide working-distance range from optics to target, e.g. from approximately one centimeter to one or more meters; and
   d. are "straight ahead" in the sense that beam direction is essentially unidirectional. See for example, FIG. 3A, in which the lateral beam segments can be small, e.g., centimeters or less, compared to an overall beam length, e.g., a meter or more.

Figure 7A:
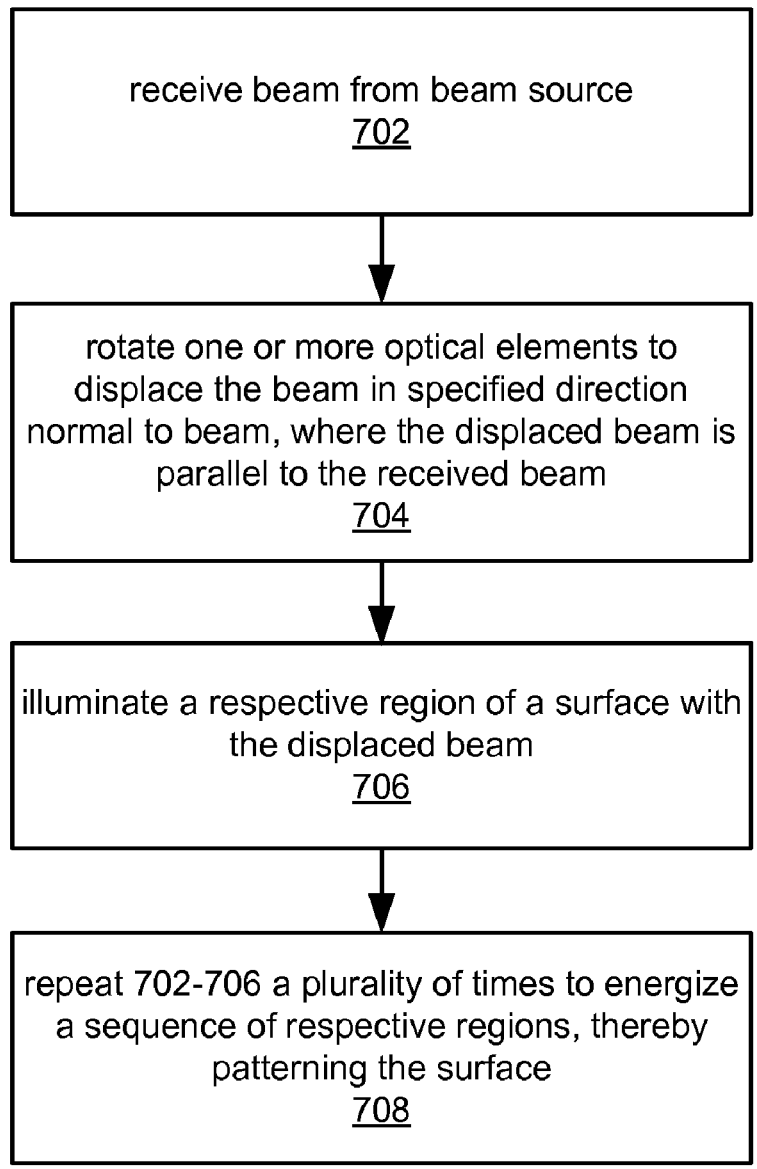
FIG. 7A flowcharts one embodiment of a method for parallel-beam scanning a surface.
Figure 7B:
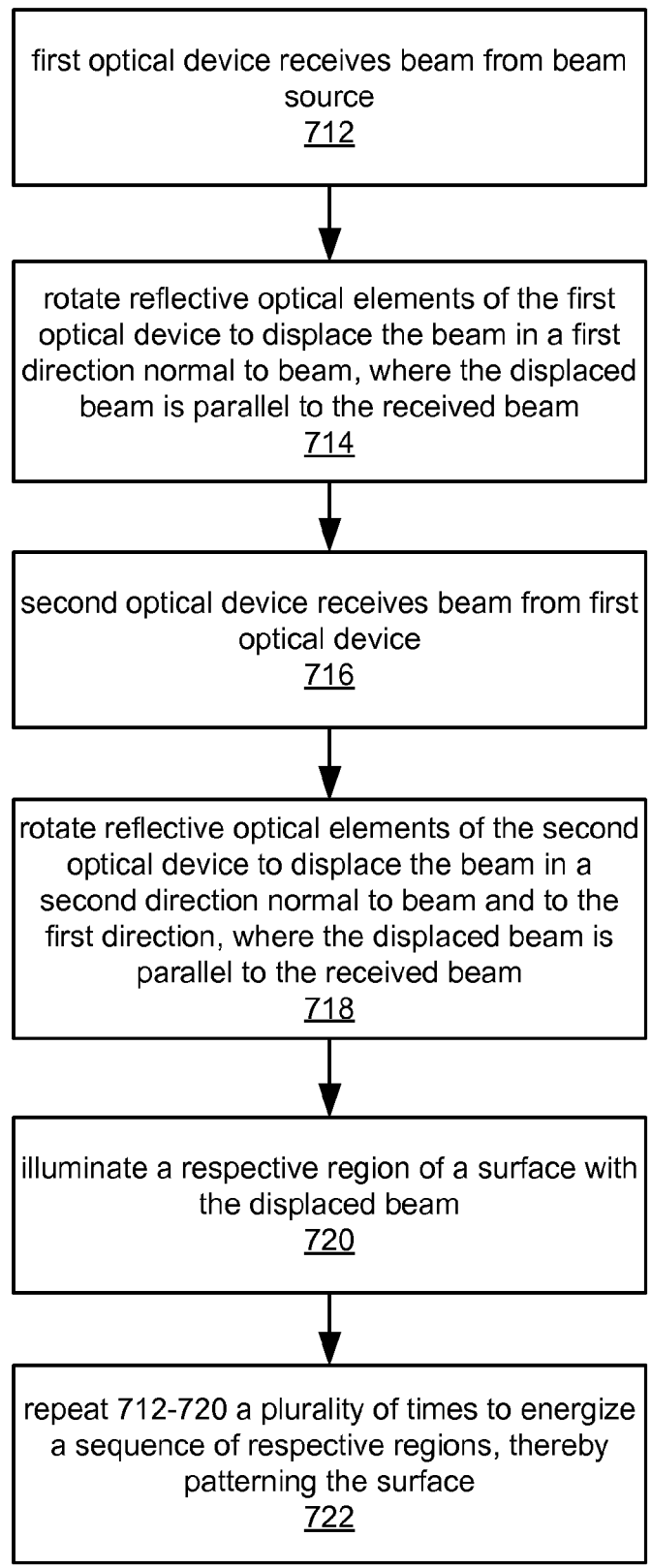
FIG. 7B flowcharts a more detailed embodiment of a method for parallel-beam scanning a surface using reflective media.

FIGS. 7A and 7B—Patterning a Surface

FIGS. 7A and 7B illustrate embodiments of a method for accomplishing real-time patterning of a surface, using an optical arrangement that obviates the least desirable features encountered in simple-galvanometer scanning. In principle embodiments of the present method are related to the flying-spot electron-beam scanning used almost exclusively for decades to create video images on the inner face of a CRT (television tube), in that a point of incidence on a target surface is moved over the surface to energize (e.g., locally heat or melt) specified regions or pixels on the surface (down to some specified depth).

FIG. 7A—High Level Flowchart of a Method for Patterning a Surface

FIG. 7A flowcharts a high level embodiment of the method. In various embodiments, some of the steps shown may be performed concurrently, in a different order than shown, or may be omitted. Additional steps may also be performed as desired. As shown, this method may operate as follows.

First, in 702 a beam may be received from an energetic beam source, e.g., by an optical device, where the beam has an initial direction. The beam source may be any of various types of beam source, such as, for example, a UV laser or other beam source, as described above. The beam is preferably a collimated radiation beam. In some preferred embodiments, a laser beam with a wavelength of approximately 193 nanometers or 308 nanometers may be used. The beam is preferably operable to locally energize an illuminated region of a surface, referred to as a "pixel", whose size is determined by the beam spot size, i.e., the beam's cross-sectional area.

The optical device preferably includes one or more elements that are rotatable about one or more respective axes, and which may operate to displace the beam in a direction orthogonal to the beam, where the beam displacement direction and magnitude correspond to the rotation (direction and magnitude). In preferred embodiments, the optical device comprises a parallel-beam scanner, various embodiments of which are described above in detail.

In 704, one or more optical elements may be rotated about respective axes to displace the beam in a specified direction orthogonal or normal to the beam, where the displaced beam is parallel to the received beam.

In 706, a respective region of the surface may be illuminated with the displaced beam, where the respective region corresponds to positions of the rotated one or more optical elements. For example, as described above in detail, the surface may comprise a silicon wafer, where the illuminated region may be heated and possibly melted to effect efficient dopant diffusion into the illuminated region. The dopant may be sourced from the enclosing gas (as in GILD) or from a layer of dopant-containing material, such as heavily doped silicon (e.g. with Boron or other P-type dopant, or Phorphorous or Arsenic or other N-type dopant) deposited using sputter-epitaxy, or a spin-on dopant such as boron or arsenic.

In 708, the method elements of 702-706 may be repeated to energize a specified sequence of respective regions of the surface, thereby patterning the surface. In other words, the method may operate to perform parallel-beam scanning on the surface, where, depending on the control algorithm used, the scanning may comprise raster scanning and/or vector scanning of the surface.

FIG. 7B—Detailed Flowchart of a Method for Patterning a Surface Using Reflective Optical Devices FIG. 7B flowcharts a more detailed embodiment of the method of FIG. 7A, based on the parallel-beam scanner described above with respect to FIG. 3A and FIG. 3B. More specifically, the method of FIG. 7B is performed by a system that includes a pair of optical devices, i.e., a first and a second optical device, each operable to perform a parallel displacement of a beam in a respective (orthogonal) direction orthogonal to the beam, where the beam displacement direction and magnitude correspond to the rotation (direction and magnitude). In preferred embodiments, the pair of optical devices (e.g., with corresponding actuator(s) and control means) comprises a parallel-beam scanner, various embodiments of which are described above in detail.

For purposes of explanation, assume three mutually orthogonal axes or directions, X, Y, and Z, where Z is the axis or direction of the received beam. In this embodiment, the pair of optical devices (each comprising, for example, a coordinated pair of mirrors) correspond respectively to displacements in the X and Y directions.

As noted above, in various embodiments, some of the steps shown may be performed concurrently, in a different order than shown, or may be omitted. Additional steps may also be performed as desired. As shown, this method may operate as follows.

In 712, a first optical device may receive an energetic beam from an energetic beam source, where the beam has an initial direction. As noted above, the beam source may be any of various types of beam source, such as, for example, a UV laser, UV lamp with collimator, one or more laser diodes, or other beam source, preferably collimated. The first optical device preferably includes a pair of reflective optical elements (e.g., mirrors) that are synchronously rotatable about respective axes such that the reflective optical elements remain parallel to each other. In other words, the respective axes of the reflective optical elements are parallel to each other, such that when each element is rotated by the same angle, they remain mutually parallel. Note that since the first optical device is associated with (and is operable to effect) displacements in the X direction, the respective axes of rotation for the reflective optical elements are actually aligned with the Y axis or direction.

In 714, the reflective optical elements of the first optical device may be rotated (e.g., about their respective (Y) axes, e.g., by one or actuators under the control of a controller) to displace the beam in a specified direction orthogonal or normal to the beam, specifically, the X direction, where the displaced beam is parallel to the received beam. As noted above, the two reflective optical elements are rotated by the same amount and stay parallel. As described above in detail with reference to FIG. 2, this allows the beam to be displaced in a direction orthogonal to the beam direction, while keeping the displaced beam parallel to the original beam, i.e., the received beam of 712. The displaced beam exits the first optical element and is transmitted to the second optical element.

In 716, the second optical device may receive the beam (displaced in the first direction) from the first optical device. Similar to the first optical device, the second optical device preferably includes a pair of reflective optical elements (e.g., mirrors) that are also synchronously rotatable about respective axes that are orthogonal to the respective axes of the first optical device, such that the reflective optical elements of the second optical device remain parallel to each other. Note that since the second optical device is associated with (and is operable to effect) displacements in the Y direction, the respective axes of rotation for the reflective optical elements are actually aligned with the X axis or direction.

In 718, the reflective optical elements of the second optical device may be rotated (e.g., about their respective (X) axes, e.g., by one or actuators) to displace the beam in a specified direction orthogonal or normal to the beam, specifically, the Y direction, where the displaced beam is parallel to the received beam. As noted above, the two reflective optical elements are rotated through the same angular subtense and stay parallel, thus allowing the beam to be displaced in a direction orthogonal to the beam direction, while keeping the displaced beam parallel to the original beam, i.e., the received beam of 716. The displaced beam exits the second optical element and is transmitted to the surface.

In 720, a respective region of the surface may be illuminated with the displaced beam, where the respective region corresponds to rotational positions of the first and second optical devices. For example, as described above in detail, in a preferred embodiment, the surface may comprise a silicon wafer, where the illuminated region may be heated and possibly melted to effect efficient dopant diffusion into the illuminated region.

In 722, the method elements of 712-720 may be repeated to energize a specified sequence of respective regions of the surface, thereby patterning the surface. In other words, the method may operate to perform parallel-beam scanning on the surface, where, depending on the control algorithm used, the scanning may comprise raster scanning and/or vector scanning of the surface.

It should be noted that in various embodiments of the methods described, any of the techniques and devices disclosed herein may be used as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for patterning a surface, comprising:
    an energetic beam source, operable to emit an energetic collimated beam, wherein the beam is operable to locally heat an illuminated region of the surface;
    two optical devices, each comprising:
        a first reflective optical element, operable to rotate around a first respective axis;
        a second reflective optical element, operable to rotate around a second respective axis, wherein the first respective axis and the second respective axis are parallel; and
        at least one actuator coupled to the first and second reflective optical elements, and operable to respectively rotate the first and second reflective optical elements around the first and second respective axes in a coordinated manner such that the first and second reflective optical elements are parallel, wherein the optical device is operable to perform a parallel displacement of the beam in a respective direction, and wherein the respective direction is orthogonal to the beam;
    wherein the two optical devices comprises a first optical device and a second optical device, wherein the first optical device is operable to:
        receive the beam from the beam source;
        displace the beam in a first direction; and
        transmit the displaced beam to the second optical device;
    wherein the second optical device is operable to:
        receive the displaced beam from the first optical device;
        displace the beam in a second direction; and
        transmit the displaced beam to the surface;
    wherein the second direction is orthogonal to the first direction; and
    wherein the two optical devices are operable to direct the beam to illuminate and locally heat a sequence of specified regions of the surface to pattern the surface.

2. The system of claim 1, further comprising:
    one or more controllers, operable to control the one or more actuators, time per pixel, beam on/off, and/or beam intensity.

3. The system of claim 1, wherein the one or more controller are further operable to turn beam on and off to control illumination of the specified regions.

4. The system of claim 1, wherein the beam source comprises a laser.

5. The system of claim 4, wherein the laser comprises one of:
    a low-power laser;
    one or more laser diodes;
    a medium-power laser; and
    a high-power laser.

6. The system of claim 4, wherein the laser comprises a milliwatt laser.

7. The system of claim 4, wherein the laser comprises an ultra-violet (UV) laser.

8. The system of claim 4, wherein the laser has a wavelength of approximately 193 nanometers.

9. The system of claim 4, wherein the laser has a wavelength of approximately 308 nanometers.

10. The system of claim 1, wherein the beam source comprises one or more UV lamps with a collimator.

11. The system of claim 1,
    wherein the surface comprises a semiconductor material surface; and
    wherein the optical device is operable to perform parallel-beam scanning to selectively melt the surface of the material.

12. The system of claim 1,
    wherein the surface comprises a semiconductor surface; and
    wherein the optical device is operable to perform parallel-beam scanning in a solid phase diffusion process.

13. The system of claim 1,
    wherein the surface comprises a semiconductor surface; and
    wherein the optical device is operable to perform parallel-beam scanning in a liquid phase diffusion process.

14. The system of claim 1, wherein the optical device is operable to perform one or more of:
    parallel-beam raster scanning; and
    parallel-beam vector scanning.

15. The system of claim 1, further comprising:
    a beam size manipulator, operable to change the size of the beam prior to illuminating the surface.

* * * * *